United States Patent [19]

Hillmann

[11] 4,190,938

[45] * Mar. 4, 1980

[54] MACHINE WITH PROCESSING HEADS

[76] Inventor: Hans Hillmann, Hirschgraben 19, D 6603 Sulzbach, Saar, Fed. Rep. of Germany

[*] Notice: The portion of the term of this patent subsequent to Aug. 29, 1995, has been disclaimed.

[21] Appl. No.: 917,882

[22] Filed: Jun. 22, 1978

Related U.S. Application Data

[62] Division of Ser. No. 776,429, Mar. 10, 1977, Pat. No. 4,109,360.

[30] Foreign Application Priority Data

Mar. 11, 1976 [DE] Fed. Rep. of Germany ....... 2610185

[51] Int. Cl.² ...................... B23B 39/20; B23Q 3/157
[52] U.S. Cl. ...................................... 29/26 A; 408/35
[58] Field of Search ................. 29/26 A, 568; 408/35; 74/813 L, 817, 822, 827

[56] References Cited

U.S. PATENT DOCUMENTS

| | | | |
|---|---|---|---|
| 2,957,566 | 10/1960 | Brown | 192/149 |
| 3,203,017 | 8/1965 | Holzl | 408/35 X |
| 3,733,929 | 5/1973 | Fatula | 74/813 L X |
| 3,797,363 | 3/1974 | Nohejl | 408/35 X |

*Primary Examiner*—Gil Weidenfeld
*Attorney, Agent, or Firm*—Roylance, Abrams, Berdo & Farley

[57] ABSTRACT

A machine for performing cutting operations on a workpiece has a rotatable carrier with several releasable processing heads which have rotatable spindles to hold cutting tools. A carrier drive mechanism is mounted on the machine to drive the carrier until a selected one of the heads is adjacent a spindle drive at the work station. The carrier drive has a crank on a rotatable shaft and a slidable plate with a recess to engage the crank to lock the carrier drive in an accurately predetermined position. The spindle drive has a hook and sliding plate mechanism to connect the selected head to the spindle drive. A latch device for releasably holding each head to the carrier is also disclosed.

1 Claim, 7 Drawing Figures

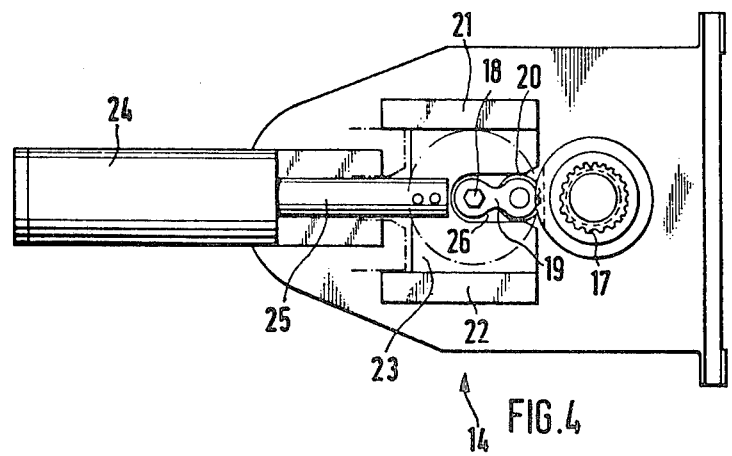
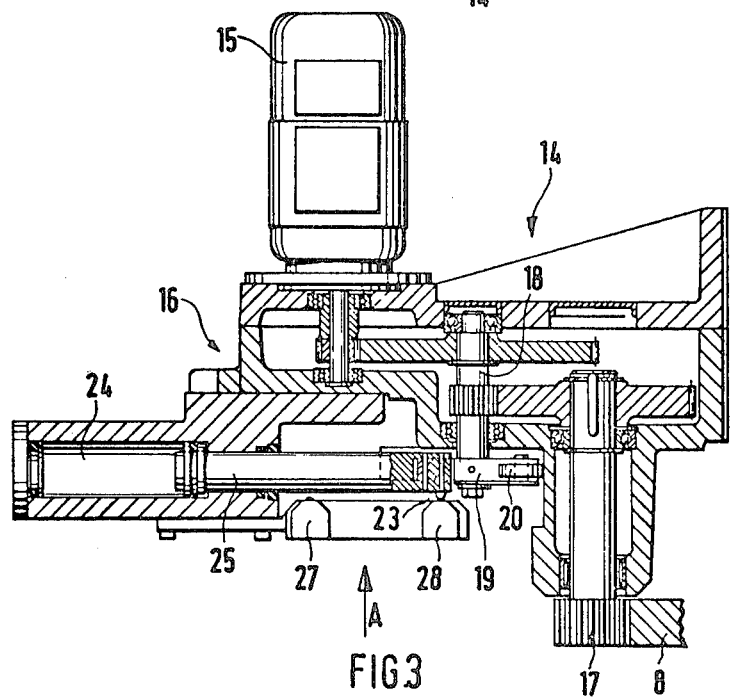

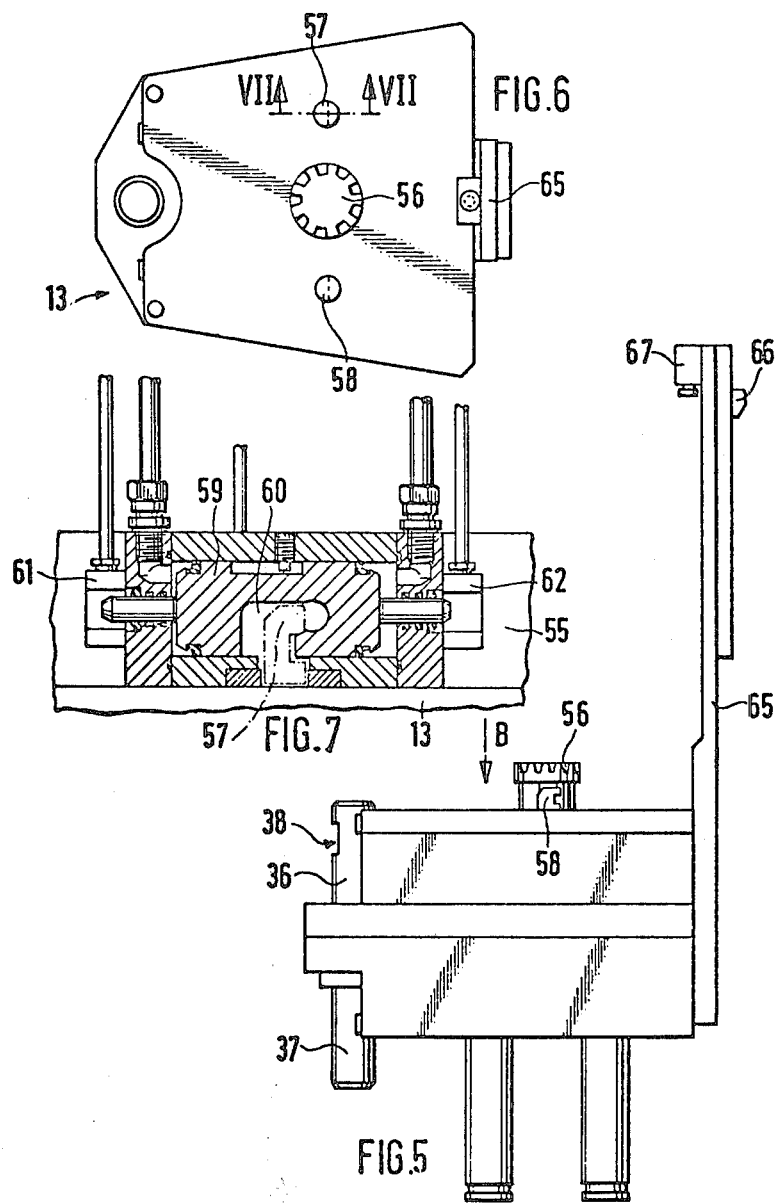

4,190,938

MACHINE WITH PROCESSING HEADS

This is a division of application Ser. No. 776,429, filed Mar. 10, 1977, now U.S. Pat. No. 4,109,360.

This invention relates to a machine tool of a type having a plurality of processing heads, each having one or more tool-carrying spindles.

BACKGROUND OF THE INVENTION

In a prior art machine of this general type, a plurality of processing heads are attached to a swiveling or rotatable disc which is disposed to be rotatable about a horizontal axis and which can be secured in certain swiveling positions by index pins. The index pins can either be attached solidly, as a result of which the swiveling disc must be shifted in an axial direction and, in addition to the securing of the position, a coupling of the operating head nearest to the processing location can be achieved with an operating spindle. Alternatively, the index pins and the coupling are axially shiftable so that an axial shifting of the swiveling disc is not necessary. The processing head coupled with the driving spindle can, in addition, be pressed against the housing of the machine. In a device of this type, the swiveling disc is difficult to align as a result of the swiveling process, since the masses which are to be moved will not permit a swiveling movement through a precisely determined sector angle. Moreover, the processing head, connected firmly to the swiveling disc, causes difficulties during the fixation in its operating position and in coupling with the driving spindle. An apparatus of this type is shown in German Offenlegungsschriften No. 19,31,559.

BRIEF DESCRIPTION OF THE INVENTION

An object of the present invention is to provide a machine in which there is precise alignment of the swivel carrier in the position established by a driving motor, and which includes simple means for connecting or disconnecting the processing head to and from the driving spindle and to or from the operating spindle so that the processing head can be developed for controlling the operating processes which are to be carried out by the head.

Briefly described, the invention includes, in a machine of the type having a base structure, a carrier rotatably mounted on the base structure, a plurality of processing heads each having a rotatable spindle mounted thereon, means for releasably mounting the heads on and rotatable with the carrier at locations such that the central angles between spindles are equal, carrier drive means mounted on the base structure and engaging the carrier to rotatably drive the carrier, spindle drive means mounted on the base structure and angularly separated from the carrier drive means, the carrier drive means including means for securing the carrier in a rotational position in which the selected one of the processing heads is located adjacent the spindle drive means such that the spindle drive means can be coupled to a spindle therein by a releasable coupling, the improvement wherein the carrier drive means includes a rotatable shaft, a crank mounted on said shaft for rotation therewith; a slide member mounted in the plane of said crank, said slide member having means defining a recess shaped to receive said crank in one position thereof, means for supporting said slide member for sliding movement perpendicular to the axis of rotation of said shaft, and means for moving said slide member into receiving engagement with said crank in said one position to thereby fix said crank and said carrier drive means in the then-existing rotational position.

The invention further includes a releasable coupling having clamping means for releasably connecting the selected one of the processing heads to the structure adjacent the spindle drive means for aligning the spindle on the processing head with said spindle drive means, the clamping means including a hook member protruding from the processing head, said hook having a beveled exterior surface and a laterally inwardly extending notch, a recess in the structure adjacent the spindle drive means for receiving the hook, and a laterally movable slide within the recess, the slide being movable into engagement with the notch.

A machine having the crank and slide arrangement may then be driven by a positioning and stop motor with pull chains and provided with a brake with which the swiveling carrier may be rotated relatively quickly. The use of an expensive and slowly operating stepping motor is therefore not needed.

In order that the manner in which the foregoing and other objects are attained in accordance with the invention can be understood in detail, particularly advantageous embodiments thereof will be described with reference to the accompanying drawings, which form a part of this specification, and wherein:

FIG. 3 is an enlarged side elevation, in partial section, of a portion of the machine of FIG. 1 showing the carrier drive means;

FIG. 4 is a bottom plan view of the apparatus of FIG. 3;

FIG. 5 is a side elevation of a processing head such as shown in FIGS. 1 and 2, showing the clamping means;

FIG. 6 is a top plan view of the apparatus of FIG. 5; and

FIG. 7 is an enlarged partial side elevation of the clamping apparatus for a processing head usable in the machine of FIG. 1.

Figure 1:
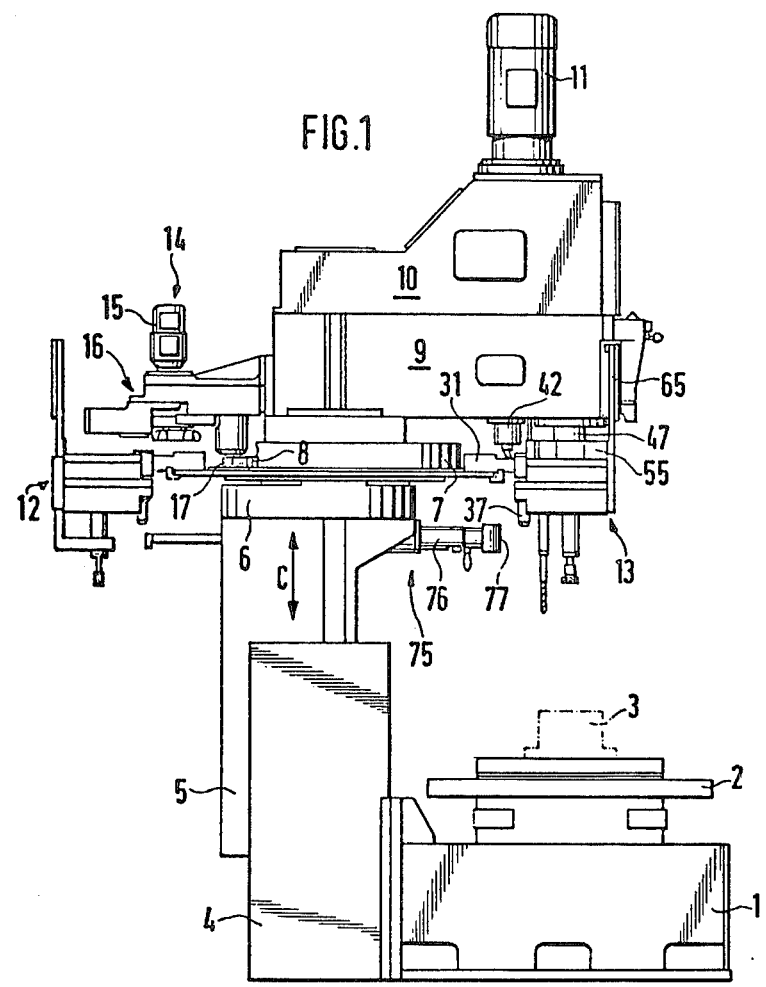
FIG. 1 is a side elevation of a machine incorporating the present invention.

Referring now to the drawings in detail, it will be seen that FIG. 1 shows a machine having a basic frame 1 which can be set on the floor, the machine having a "coordinate" table 2 on which a workpiece 3, shown in phantom lines, can be attached. Laterally on base frame 1, a guide unit 4 is attached, also resting on the floor, unit 4 having a column post unit 5 mounted thereon in a well-understood fashion such that unit 5 can be moved in a vertical direction as indicated by double-headed arrow C to change the vertical relationship between the tool and the workpiece.

Column post unit 5 includes a cylindrically developed stepped mounting block 6 on which an annular swiveling or rotating carrier 7 is rotatably mounted by means of roller bearings. The rotating carrier 7 is fixedly attached to a toothed gear ring 8. On bearing block 6, and passing through the toothed gear ring 8 and the swiveling carrier 7, there is attached an arm 9 which carries the driving unit 10 on which a driving motor 11 is disposed with perpendicular axis laterally displaced from the axis of rotation of the gear ring and carrier.

The rotating carrier carries on its outside circumference a plurality of processing heads of which only the heads 12 and 13 are shown. The carrier may have a relatively large number of heads, such as, for example, 20. On the side facing away from drive motor 11 and mounted on arm 9, there is attached a rotating carrier drive. This drive includes a driving motor 15 which drives a driving pinion 17 through a rotating drive 16 (more clearly shown in FIG. 3), the pinion 17 meshing with the teeth of gear ring 8. A shaft 18 of the gear arrangement 16 projects downwardly in parallel with the rotating axis of gear 17 and carries at its lower end a crank 19. As seen in FIGS. 3 and 4, crank 19 is attached to shaft 18 by a hub portion and has at its distal end a roller 20 which is rotatable about an axis parallel with the axis of shaft 18. The diameter of roller 20 corresponds approximately to the diameter of the crank 19 in the area of its hub. Guide rails 21 and 22 are mounted to the housing portion of assembly 16, the guide rails having parallel inner surfaces to guide the movement of a sliding plate 23 which is connected to a piston rod 25 having a piston portion disposed within an operating cylinder 24. Slide 23 has an inwardly extending generally U-shaped recess 26 which corresponds to the shape of crank 19 and roll 20 and has a transverse dimension approximately equal to the diameter of the hub and roller. At the portion where the recess opens outwardly at the end of plate 23, the edges of the opening are beveled or wedge-shaped. The driving motor 15 is developed as a positioning and stop motor provided with a brake and is driveable at various speeds, for example 3,000 rpm and 400 rpm, in order to be able to drive the rotating carrier quickly and to be able to stop it. Thus, the driving motor 15 has been developed as a braking motor which, depending on the control, may carry out a certain number of revolutions. The rotating gear box assembly 16 has a rather large reduction in the order of 1:360. Because of the mass inertia which exists when the rotating carrier 7 is being rotated, it may happen that the selected processing head 13 will not reach its precisely proper position below the operating motor 11. Such position is exactly defined when crank 19 is in the position shown in FIG. 4. As will be recognized, plate 23 is withdrawn from the crank while carrier 7 is being rotated, and if the carrier overshoots its position slightly, crank 19 will be disposed at an angle from the position shown in FIG. 4. By shifting slide 23 in the direction of driving pinion 17, the crank 19 will be engaged by the recess and aligned in the position shown in FIG. 4. Thus, the processing head 13 can be positioned precisely. In order to position the plate, fluid under pressure is supplied to cylinder 24 to drive piston 25 in a well-understood manner.

The two positions of piston rod 25 can be determined by sensors 27 and 28 which cooperate with the piston rod. These sensors can be, for example, microswitches which are connected to the control circuitry for the motors in an interlock fashion. With such proper connections, driving motor 15 cannot start whenever slide 23 is located in the position shown in FIGS. 3 and 4, the sensor 28 being operated to open the motor control circuit when in the position illustrated in FIG. 3. However, when piston rod 25 is moved axially so that sensor 27 is actuated, the driving motor can be driven.

Figure 2:
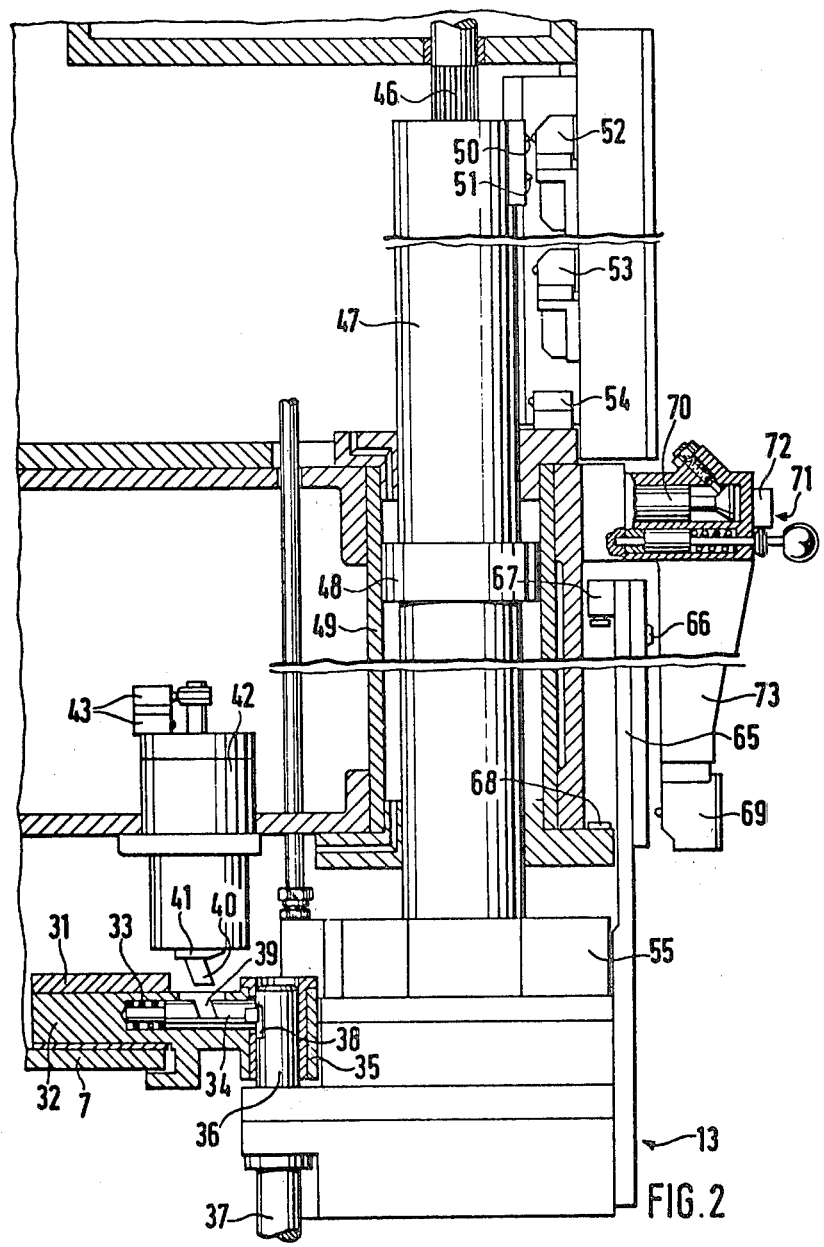
FIG. 2 is an enlarged side elevation, in partial section, of a portion of the machine of FIG. 1 showing the spindle drive means and devices adjacent thereto.

The apparatus includes a mechanism for releasably retaining each processing head on the rotatable carrier. These devices are identical for each processing head, and only one thereof will be described. As best seen in FIG. 2, a holding bushing 31 is fixedly attached to the rotating carrier for each of the processing heads, the bushing containing a holding body 32 which can have a slight axial clearance and in which a locking latch bolt 34 is disposed. Bolt 34 is axially movable and is urged outwardly away from body 32 by the action of a compression coil spring 33. Holding body 32 has, on its end facing away from rotating carrier 7, a receiving sleeve 35 having a vertically oriented bore for the reception of a bolt 36. Bolt 36 is fixedly attached to the processing head and is disposed vertically, projecting upwardly from a flange on the head. The head also has a bolt 37 projecting downwardly and disposed in coaxial relationship with bolt 36. Bolt 36 has a laterally inwardly extending recess 38 for engagement with an end of locking latch bolt 34. On the upper side of bolt 34 there is provided a slanting slot 39, the slot having sloping walls defining a cam surface. An operating cylinder 42 is fixedly attached to arm 9 of the machine, cylinder 42 having a piston rod 41 which is vertically movable and which carries a shiftable member 40 which is developed as a slanting member, the sloping portion thereof corresponding to the slope of notch 39. At the upper end of rod 41 is a cam member capable of actuating either one of two sensors 43 which can be in the nature of microswitches similar to sensors 27 and 38. The shifting member 40 which is shiftable in a vertical direction is downwardly movable to engage the slot and cause, by a camming action, the locking latch bolt 34 to move axially in the direction toward rotating carrier 7 to extract bolt 34 from engagement with recess 38 in bolt 36. Extraction of bolt 34 permits bolt 36 and the processing head attached thereto to be moved in a vertical direction.

Turning now to the spindle drive mechanism, the driving motor 11 serves to drive a splined shaft 46 shown in FIG. 2, which shaft is fixedly rotatably connected with the driving shaft shiftable in a vertical direction. The driving shaft, which has not been shown, is mounted rotatably in a liftable and lowerable, but not rotatable, operating sleeve 47 which is guided along a guide rail which is U-shaped in cross-section. Operating sleeve 47 carries a piston 48 which can be shifted in the cylinder jacket 49, the cylinder covers of which have conventional hydraulic connections. Operating sleeve 47 on its topside carries a control plate with control cams 50 and 51 which cooperate alternatingly with sensor switches 52, 53 and 54. The switches 52 and 54 determine the upper and lower terminal positions of the operating sleeve 47, respectively, and switch 53 determines an intermediate position. The control plate serves for securing the rotational position of the operating sleeve 47 in the U-shaped guide rail. The operating sleeve 47 on its underside carries a coupling disc which is axially shiftable counter to the action of a spring which is surrounded by an annular locking plate 55. The operating head 12 or 13 on its upper surface has a coupling disc 56 adapted to the coupling disc of the operating sleeve 47, which coupling disc is firmly rotatably connected with the tools of the processing head as seen in FIGS. 5 and 6.

The processing head 13 has on its upper surface two hooks 57 and 58 in order to center the head with respect to locking plate 55 and for clamping connection of the head to the locking plate with the help of an arrangement for each hook as shown in FIG. 7. Hooks 57 and 58 are formed so as to have a beveled or slightly cone-shaped basic body having the smaller diameter on top, the body having a laterally inwardly extending notch. Each of the arrangements as shown in FIG. 7 is disposed laterally of the axis of the operating sleeve 47 for the engagement of one of the hooks 57 and 58, the locking plate 55 being connected with the cylinder jacket of an operating cylinder in which a piston 59 is axially shiftable by means of an hydraulic or pneumatic pressure agent. The piston 59 has in its middle a recess 60 which opens in a downward direction and which serves for the reception of a hook 57 or 58, the recess being shaped such that the hook can be seized by piston 59. The two terminal positions of the piston 59 can be indicated by sensors 61 and 62 which detect the presence of pins disposed on the opposite ends of piston 59 and extend through the ends of the cylinder.

Processing heads 12 and 13, which are illustrative of the several heads mountable on the rotating carrier, can be developed as multi-spindle drill heads, as multi-spindle threaded heads having a lead screw, or else simply having a spindle. On the body of a drill head such as 12 or 13, a plate-shaped control part 65 (FIGS. 1, 2, 5 and 6) is attached which, in the position of insertion of the drill head, is disposed perpendicularly. Plate 65 carries control cams 66 as well as a stop element 67. The stop element 67 cooperates with a stop member 68 which is attached to the cylinder cover (FIG. 2) and the control cam 66 or the control cams with a switch 69, which can be developed as a multiple switch. With the help of the control mechanism 66 and 69, the speed of the driving shaft 46, its feed, the reversal from the rapid feed into operating feed and vice versa, the depth of the drilling or of a thread, the supply of coolant and/or air for blowing out holes, or the like, can be controlled.

The switch 69 is attached to a switch carrier 73 which is formed as an arm which juts out from arm 9 and which is swivelable around a swiveling pin 70 attached to the housing of the machine (FIG. 2). By means of a locking arrangement 71 manually operable against the action of a spring, the control carrier may be fixed or released for swiveling around the swiveling pin 70. The position of the locking member of the locking arrangement 71 may be indicated by means of a sensor 72.

The processing head 12 or 13 may be removed from the machine by means of a drill head exchange arrangement 75 (FIG. 1) which includes a bar 76 manually shiftable in a horizontal direction on which a bushing 77 is attached for the reception of bolt 37.

By the use of this machine, a workpiece can be processed by chucking the workpiece on the holding table only one time. The workpiece can then be acted on with various tools, especially groups of tools in succession in an automatic operating cycle. The processes for separation, connection, and coupling and for the further moving of the processing heads takes place very simply. For lifting and lowering of the drill head 13 connected with the operating sleeve 47, the bolt 34 is removed from the recess 38 of the bolt 36, thus permitting vertical movement of the carrier.

While certain advantageous embodiments have been chosen to illustrate the invention, it will be understood by those skilled in the art that various changes and modifications can be made therein without departing from the scope of the invention as defined in the appended claims.

What is claimed is:

1. In a machine of the type having a base structure, a carrier rotatably mounted on said base structure, a plurality of processing heads each having a rotatable spindle mounted thereon, means for releasably mounting said heads on and with said carrier at locations such that the spindles are substantially equally spaced apart, carrier drive means mounted on said base structure and engaging said carrier to rotatably drive said carrier, spindle drive means mounted on said base structure and angularly separated from said carrier drive means, the carrier drive means including means for securing said carrier in a preselected rotational position in which
 a selected one of said processing heads is located adjacent said spindle drive means such that said spindle drive means can be coupled to a spindle therein by a releasable coupling, the improvement wherein said carrier drive means comprises
 a rotatable shaft;
 a crank mounted on said shaft for rotation therewith;
 a slide member mounted in the plane of said crank, said slide member having means defining a recess shaped to receive said crank in either one of only two rotational positions of said crank, said two positions being separated by 180° of crank rotation;
 means for supporting said slide member for sliding movement toward and away from said shaft in a plane lying at an angle to the axis of said shaft; and
 means for moving said slide member into receiving engagement with said crank in said one of said positions to thereby fix said crank and said carrier drive means in the preselected rotational position.

* * * * *